United States Patent Office 2,782,221
Patented Feb. 19, 1957

2,782,221

PRODUCTION OF TEREPHTHALATES FROM CYCLOHEXANE-2,5-DIOL-1,4-DICARBOXYLATES

Hugh Wilma Boulton Reed, Norton-on-Tees, England, assignor to Imperial Chemical Industries Limited, a corporation of Great Britain No Drawing. Application March 27, 1953,
Serial No. 345,260

Claims priority, application Great Britain April 28, 1952

8 Claims. (Cl. 260—475)

This invention relates to the production of acids, acid esters and di-esters.

According to the present invention, there is provided a process for the production of terephthalic acid or acid esters or di-esters thereof, which comprises dehydrating cyclohexane-2,5-diol-1,4 dicarboxylic acid or acid esters or di-esters thereof, and simultaneously or subsequently dehydrogenating the cyclohexa-1,4-diene-1,4-dicarboylic acid or acid esters or di-esters produced.

Thus, by the process of the present invention, dimethyl cyclohexane-2,5-diol-1,4 dicarboxylate may be converted to dimethyl terephthalate together with methyl hydrogen terephthalate and terephthalic acid; methyl hydrogen cyclohexane-2,5-diol-1,4 dicarboxylate may be converted to methyl hydrogren terephthalate and terephthalic acid; cyclohexane-2,5-diol-1,4-dicarboxylic acid may be converted to terephthalic acid.

The dehydration of cyclohexane-2,5-diol-1,4-dicarboxylic acid or acid esters or di-esters thereof may be carried out in any of the four ways disclosed below.

1. *Thermal dehydration.*—The thermal dehydration of cyclohexane-2,5 diol-1,4-dicarboxylic acid or acid esters or di-esters thereof may be carried out by contacting the acid or acid ester or di-ester with a bed of inert granular material, such as quartz chips, maintained at an elevated temperature of 200° to 500° C.

Alternatively, the cyclohexane-2,5-diol-1,4-dicarboxylic acid or acid esters or di-esters thereof may be thermally decomposed by heating them at a temperature of 200° to 500° C. in an unpacked reaction zone.

When dimethyl cyclohexane-2,5-diol-1,4-dicarboxylate is used as the starting material, this may be thermally decomposed in either the liquid or vapour phase. The product comprises methyl hydrogen cyclohexa-1,4-diene-1,4-dicarboxylate together with minor amounts of di-methyl cyclohexa-1,4 diene-1,4-dicarboxylate and cyclohexa-1,4-diene-1,4 dicarboxylic acid.

When methyl hydrogen cyclohexane-2,5-diol-1,4 dicarboxylate is used as the starting material, this may be thermally decomposed in the liquid phase. The product comprises methyl hydrogen cyclohexa-1,4 diene-1,4-dicarboxylate together with a minor amount of cyclohexa-1,4 diene-1,4-dicarboxylic acid.

When cyclohexane-2,5 diol-1,4- dicarboxylic acid is used as the starting material, this may be thermally decomposed in the liquid phase; the product comprises cyclohexa-1,4 diene-1,4-dicarboxylic acid.

2. *Thermal dehydration to give a lactone, followed by catalysed dehydration of the lactone.*—In this process, the diol is heated at a temperature of at least 170° C. in a suitable solvent, for example, xylenols, decahydronaphthalene, diphenyl oxide or nitrobenzene. It is convenient to carry out this reaction by refluxing the solution under atmospheric pressure. When using dimethyl cyclohexane-2,5 diol-1,4- dicarboxylate as the starting material, the major product is a lactone, 4-carbomethoxy-2-hydroxy-6-oxabicyclo-(3:2:1)-octa-7-one, which has a structure:

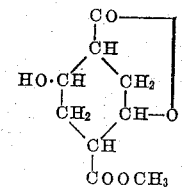

On the addition of an acid, such as p-toluene sulphonic acid, to the boiling reaction mixture, the lactone decomposes to give cyclohexa-1,4 diene-1,4 dicarboxylic acid, and a polymeric anhydride which is believed to have the structure:

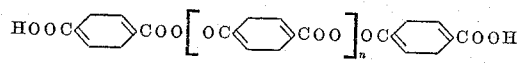

Thus, if it is desired to obtain a di-ester by this route, it is necessary to hydrolyse the polymerised acid anhydride and to re-esterify the product. The hydrolysis may be carried out using aqueous caustic alkali; the hydrolysed product on treatment with, for example, methanol and sulphuric acid may be converted to dimethyl cyclohexa-1,4 diene-1,4 dicarboxylate.

If in the dehydration process methyl hydrogen cyclohexane-2,5 diol-1,4 dicarboxylate is used as the starting material, two lactones possessing the structures:

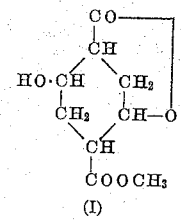 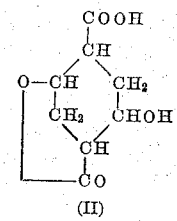

(I)            (II)

are obtained in the first stage of the thermal dehydration. These compounds, on treatment with an acid at elevated temperature give cyclohexa-1,4 diene-1,4 dicarboxylic acid and the polymeric anhydride.

When using cyclohexa-2,5 diol-1,4 dicarboxylic acid as the starting material, this gives the lactone (II) in the first step of the process, and this may be converted as described above to cyclohexa-1,4 diene-1,4 dicarboxylic acid.

3. *Catalytic dehydration.*—When dimethyl cyclohexane-2,5 diol-1,4 dicarboxylate is contacted, in the liquid or vapour phase, with a dehydration catalyst such as alumina, an alumina-silica gel, an activated clay, zinc oxide or basic aluminium phosphate, the catalyst temperature being maintained at 200° to 500° C., a product is obtained which comprises a major amount of methyl hydrogen cyclohexa-1,4 diene-1,4 dicarboxylate, and minor amounts of dimethyl cyclohexa-1,4 diene-1,4 dicarboxylate and cyclohexa-1,4 diene-1,4 dicarboxylic acid. Similarly, when the starting material comprises methyl hydrogen cyclohexane-2,5 diol-1,4 dicarboxylate, the products are methyl hydrogen cyclohexa-1,4 diene-1,4 dicarboxylate and cyclohexa-1,4 diene-1,4 dicarboxylic acid and when the starting material comprises cyclohexane-2,5 diol-1,4 dicarboxylic acid, the major product is cyclohexa-1,4 diene-1,4 dicarboxylic acid. When using the acid ester or di-acid as the starting material, liquid phase operation is employed.

4. *Dehydration with a chemical dehydrating agent.*—The dehydration of cyclohexane-2,5 diol-1,4 dicarboxylic acid or acid esters or di-esters thereof may be carried out by the use of a chemical dehydrating agent such as potassium hydrogen sulphate, phosphoric acid, sulphuric acid, or a sulphonic acid, for example, p-toluene sulphonic acid. Thus, on heating cyclohexane-2,5 diol-1,4 dicarboxylic acid or the methyl hydrogen ester or dimethyl ester thereof with one of the dehydrating agents disclosed above, a product comprising cyclohexa-1,4 diene-1,4 dicarboxylic acid and the corresponding polymeric anhydride is obtained; the polymeric anhydride may be converted to dimethyl cyclohexa-1,4 diene-1,4 dicarboxylate by the hydrolysis with an aqueous alkali and subsequent esterification, with, for example, methanol and sulphuric acid.

The dehydration of cyclohexane-2,5 diol-1,4 dicarboxylic acid or an acid ester or di-ester may be carried out by heating with the chemical dehydrating agent, the water and any alcohol formed in the reaction being removed by distillation.

If desired, the dehydration by means of a chemical dehydrating agent may be carried out in the presence of a high-boiling solvent such as xylenols, decahydronaphthalene or nitrobenzene, and the cyclohexa-1,4 diene-1,4 dicarboxylic acid and the polymeric anhydride thereof separated by filtration or decantation of the product.

The cyclohexa-1,4 diene-1,4 dicarboxylic acid or acid esters or di-esters thereof produced as disclosed above may be converted to terephthalic acid or acid esters or di-esters thereof by thermal treatment, or by catalytic dehydrogenation, or by treatment with an oxidising agent. These possibilities will now be discussed in turn.

1. *Thermal treatment of the diene.*—On heating cyclohexa-1,4 diene-1,4 dicarboxylic acid at a temperature of 150° to 750° C., this compound may be converted to terephthalic acid. Similarly, methyl hydrogen cyclohexa-1,4 diene-1,4 dicarboxylate, on heating, will give methyl hydrogen terephthalate.

The most suitable starting material for use in this process is, however, dimethyl cyclohexa-1,4 diene-1,4 dicarboxylate, since this compound is more volatile than the corresponding diacid or acid ester. Thus, it may be contacted in the vapour phase with an inert packing material, such as quartz chips, maintained at a temperature of 150° to 750° C. Alternatively, the dimethyl ester may be passed through an unpacked pyrolysis zone maintained at a temperature of 150° to 750° C.

2. *Catalytic dehydrogenation of the diene.*—Cyclohexa-1,4 diene-1,4 dicarboxylic acid or an acid ester or di-ester thereof may be dehydrogenated by contacting with a dehydrogenation catalyst under suitable conditions.

Catalysts which are suitable include those comprising a metal of group VIII of the periodic system or copper. These metals may be supported upon porous materials such as alumina, magnesia, silica or kieselguhr, or may be employed in a finely divided state. Other catalysts which may be employed are the oxides of chromium, molybdenum and vanadium; these oxides may be employed in admixture with, or supported upon, other oxides such as alumina.

When dimethylcyclohexa-1,4 diene-1,4, dicarboxylate is used as the starting material, this may be contacted in the liquid or vapour phase with a catalyst as described above maintained at a temperature within the range of 200° to 650° C. The products include terephthalic acid, methyl hydrogen terephthalate and dimethyl terephthalate.

Similarly, methyl hydrogen cyclohexa-1,4 diene-1,4 dicarboxylate may be dehydrogenated to a mixture comprising terephthalic acid and methyl hydrogen terephthalate, while cyclohexa-1,4 diene-1,4-dicarboxylic acid may be dehydrogenated to terephthalic acid.

3. *Treatment with an oxidising agent.*—Cyclohexa-1,4 diene-1,4 dicarboxylic acid may be oxidised to terephthalic acid by heating with sulphur or selenium. Similarly, dimethyl and methyl hydrogen esters of cyclohexa-1,4 diene-1,4 dicarboxylic acid may be converted respectively to dimethyl and methyl hydrogen terephthalate.

A reaction of this type is conveniently carried out at a temperature of 150° to 300° C.

It is an important feature of the present invention that di-alkyl cyclohexane-1,4 diol-1,4 dicarboxylates may be converted to terephthalic acid and acid esters and di-esters thereof by a purely thermal process. For example, dimethyl cyclohexane-1,4 diol-1,4 dicarboxylate, dissolved in a suitable solvent such as toluene, may be contacted with silica chips maintained at a temperature of the order of 250° to 350° C.; in this step, the dimethyl cyclohexane-1,4-diol-1,4 dicarboxylate is dehydrated to a mixture comprising methyl hydrogen cyclohexa-1,4 diene-1,4 dicarboxylate and minor amounts of dimethyl cyclohexa-1,4 diene-1,4 dicarboxylate and cyclohexa-1,4 diene-1,4 dicarboxylic acid. This mixture on heating to a temperature of the order of 450° to 550° C. is dehydrogenated giving a mixture comprising methyl hydrogen terephthalate, and minor amounts of dimethyl terephthalate and terephthalic acid.

It is possible to carrry out this thermal process in a single stage by operation at a temperature of 350° to 450° C.; the total yield of terephthalic acid and acid ester and di-ester thereof is, however, lower than when using the two-stage process disclosed above.

The cyclohexane-1,4 diol-1,4 dicarboxylic acid or acid esters or di-esters thereof for use as starting materials in the process of the present invention may be produced by any suitable means. It is an important feature of the present invention that the dialkyl cyclohexane-1,4 diol-1,4 dicarboxylates may be produced from dialkyl succinates.

This process is carried out by treating a dialkyl succinate with a condensing agent such as an alkali or alkaline earth metal, or an alkoxide of one of these metals, sodium and potassium alkoxides being particularly suitable. Thus, a dialkyl succinate may be converted by means of a condensing agent such as a sodium alkoxide to a product comprising the disodium derivative of a dialkyl cyclohexa-1,4 diene-2,5 diol-1,4 dicarboxylate. For example, when dimethyl succinate is condensed in the presence of sodium methoxide, dimethyl disodio-cyclohexa-1,4 diene-2,5 diol-1,4 dicarboxylate is obtained. This compound is believed to possess a structure:

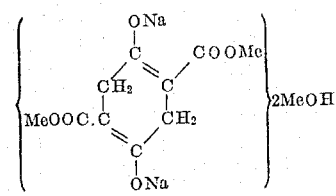

The sodium salts described in the preceding paragraph may be converted to dialkyl cyclohexane-2,5 diol-1,4 dicarboxylates by any known chemical process. For example, to produce dimethyl cyclohexane-2,5 diol-1,4 dicarboxylate from dimethyl disodio-cyclohexa-1,4 diene-2,5 diol-1,4 dicarboxylate, the latter may be hydrolysed, e. g. by means of a dilute mineral acid and the dimethyl cyclohexa-1,4 diene-2,5 diol-1,4 dicarboxylate hydrogenated, using, for example, a catalyst such as copper or a metal of group VIII of the periodic system. This hydrogenation may be carried out at an elevated temperature and pressure.

EXAMPLE 1

27 grams of the dimethyl ester of cyclohexane-2,5 diol-1,4 dicarboxylic acid were dissolved in 90 grams of toluene and passed at a rate of 0.25 litre of liquid per hour per litre of reaction space through a converter maintained at a temperature of 300° C. The converter was a cylindrical tube 33" in length and 1.25" in diameter which was packed with 300 mls. of quartz chips. Nitrogen was passed through the reaction zone at a rate of 10 litres per hour.

The product after condensation consisted of solid and liquid constituents. These were separated by filtration and separately extracted with aqueous sodium bicarbonate solution. On neutralisation of the combined extracts, the mono methyl ester of cyclohexa-1,4 diene-1,4 dicarboxylic acid separated out. The product was obtained in a 70% yield. This mono methyl ester crystallised from ethanol in the form of needles melting at 224° C. to 226° C.

EXAMPLE 2

73 grams of dimethyl cyclohexane-2,5 diol-1,4 dicarboxylate and 150 mls. of diphenyl oxide were heated together, for four hours at a temperature of 200° C. 10 grams of methanol were continuously separated by distillation from the product during this period. 10% of the reaction mixture was withdrawn and analysed; the amount of 4-carbomethoxy-6-hydroxy-6-oxa bicyclo (3:2:1) octan-7-one indicated that 80% of the dicarboxylate employed had been converted to this lactone. The remaining 90% of the reaction mixture was heated with 1 gram of para-toluene sulphonic acid for two hours, during which time 7 mls. of water and methanol were removed. The product on concentration gave a mixture of cyclohexa-1,4 diene-1,4 dicarboxylic acid and the derived polymeric acid anhydride. This mixture on heating with a 2N solution of sodium hydroxide at 100° C. for 16 hours and subsequent acidification with aqueous hydrochloric acid gave an amount of cyclohexa-1,4 diene-1,4 dicarboxylic acid corresponding to 65% of the quantity theoretically expected.

EXAMPLE 3

30 grams of dimethyl cyclohexane-2,5 diol-1,4 dicarboxylate and 3 mls. of sulphuric acid were heated at 150° to 180° C. for 20 minutes; water and methanol were liberated. On cooling a product was obtained which comprised cyclohexa-1,4 diene-1,4 dicarboxylic acid and the derived polymeric acid anhydride. This product was heated with a solution of 2N sodium hydroxide at 100° C. for 14 hours, and the product acidified with aqueous hydrochloric acid. 13 grams of cyclohexa-1,4 diene-1,4 dicarboxylic acid corresponding to a yield of 60% were obtained.

EXAMPLE 4

26 grams of dimethylhexane-2,5 diol-1,4 dicarboxylate in 62 grams of toluene contained in a reservoir at 90° C. were fed over basic aluminium phosphate, in the form of 1/8" cylindrical pellets, maintained at a temperature of 350° C. The solution was fed through the catalyst zone at a rate of 5 grams of diol dicarboxylate per mole of catalyst per hour. At the same time nitrogen was passed through the catalyst zone. The product was esterified by treatment with diazo methane in ether; the yield of dimethyl cyclohexa-1,4 diene-1,4 dicarboxylate was 25%.

EXAMPLE 5

17 grams of dimethyl cyclohexa-1,4 diene-1,4 dicarboxylate in 40 grams of toluene were fed over 300 mls. of quartz chips contained in a glass tube 33" long and 1" in diameter maintained at a temperature of 500° C. The duration of the reaction was 30 minutes. Concentration of the liquid product gave 16.6 grams of dimethyl terephthalate corresponding to a yield of 98.5%.

EXAMPLE 6

32 grams of dimethyl cyclohexa-1,4 diene-1,4 dicarboxylate in 68 grams of toluene were fed over 50 mls. of a palladium-on-charcoal catalyst. The catalyst contained 5% by weight of palladium. The starting material was fed to the catalyst zone at a rate of 50 grams per hour and an atmosphere of hydrogen was maintained throughout the experiment. The product on analysis was found to contain 1.3 grams of unchanged starting material, 2.2 grams of benzene, 9.4 grams of methyl benzoate, 8.2 grams of dimethyl terephthalate, 0.4 grams of methyl hydrogen terephthalate and a trace of terephthalic acid. The combined yield of terephthalates was 28.4%.

EXAMPLE 7

10 grams of dimethyl cyclohexa-1,4 diene-1,4 dicarboxylate and 4 grams of selenium were heated at 290° to 300° C. in an atmosphere of nitrogen. Hydrogen selenide was evolved. On cooling, the solid product was extracted with ethanol under reflux, and unused selenium was separated by filtration. The ethanol solution on concentration gave 5.7 grams of dimethyl terephthalate corresponding to a yield of 56.6%.

EXAMPLE 8

28 grams of dimethyl cyclohexane-2,5 diol-1,4, dicarboxylate in 56 grams of toluene were fed over 300 mls. of quartz chips contained in a glass tube 33" in length and 1" in diameter maintained at 400° C. The duration of the experiment was 1 hour and nitrogen was fed continuously to the reaction zone. Hydrogen and carbon dioxide were liberated during the reaction.

The product was treated with diazomethane in ether and 7 grams of dimethyl terephthalate were isolated corresponding to a yield of 30%. 14.5 grams of 2-hydroxy-4 carbomethoxy-6-oxabicyclo (3:2:1) octan-7-one were also isolated. Thus, the yield of dimethyl terephthalate on the starting material, taking into account the lactone recovered was 75%.

EXAMPLE 9

26 grams of dimethyl cyclohexane-2,5 diol-1,4 dicarboxylate in 56 grams of toluene were fed over a platinum-on-charcoal catalyst maintained at a temperature of 350° C. The catalyst contained 0.5% by weight of platinum. The duration of the experiment was 30 minutes, and throughout this time an atmosphere of hydrogen was maintained in the system. Hydrogen, carbon dioxide and carbon monoxide were liberated. The liquid product containing dimethyl terephthalate, methyl hydrogen terephthalate and terephthalic acid was esterified by treatment with diazomethane in ether. 5.8 grams of dimethyl terephthalate corresponding to a yield to 26.7% by weight were obtained.

EXAMPLE 10

20 grams of dimethyl cyclohexane-2,5 diol-1,4 dicarboxylate were heated at 290° to 310° C. for 40 minutes with 0.1 gram of a palladium-on-charcoal catalyst, the catalyst containing 30% palladium by weight. Water, methanol and methyl benzoate were separted from the product by distillation. The solid residue was esterified by treatment with diazomethane and ether. 11 grams of dimethyl terephthalate were isolated, corresponding to a yield of 66%.

Examples 9 and 10 illustrate simultaneous thermal dehydration and catalytic dehydrogenation.

I claim:

1. A process for the production of a compound having the structure:

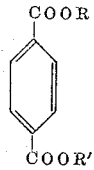

where R and R' are selected from the group consisting of hydrogen and alkyl, which comprises dehydrating a cyclohexane derivative having the structure:—

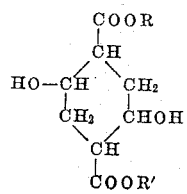

whereby there is produced a cyclohexadiene derivative having the structure:

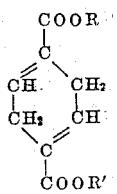

which is then dehydrogenated by thermal treatment of said cyclohexadiene derivative at a temperature within the range of from 150° to 750° C.

2. A process as claimed in claim 1 in which the dehydration reaction is carried out thermally by heating the cyclohexane derivative to a temperature of 200° to 500° C.

3. A process as claimed in claim 1 in which the dehydration reaction is carried out by heating the cyclohexane derivative in a solvent at a temperature of at least 170° C., whereby a lactone is produced, decomposing this lactone by means of an acid to give a mixture comprising cyclohexa-1,4 diene-1,4 dicarboxylic acid and a corresponding polymeric anhydride, and subsequently hydrolysing the polymeric anhydride to cyclohexa-1,4 diene-1,4 dicarboxylic acid by means of an aqueous caustic alkali.

4. A process as claimed in claim 1 in which the dehydration reaction is carried out by contacting the cyclohexane derivative with a dehydration catalyst selected from the group of oxide catalysts consisting of alumina-silica gels, activated clays, zinc oxide and basic aluminium phosphate, at a temperature of 200° to 500° C.

5. A process as claimed in claim 1 in which the dehydration reaction is carried out by heating the cyclohexane derivative with a chemical dehydrating agent selected from the group consisting of potassium hydrogen sulphate, phosphoric acid, sulphuric acid and sulphonic acids, whereby cyclohexa-1,4 diene-1,4 dicarboxylic acid and a polymerised anhydride thereof are formed, the polymerised anhydride being subsequently hydrolysed to cyclohexa-1,4 diene-1,4 dicarboxylic acid by means of an aqueous caustic alkali.

6. A process for the production of methyl esters of terephthalic acid which comprises dehydrating dimethyl cyclohexane-2,5 diol-1,4 dicarboxylate by maintaining said cyclohexane derivative at a temperature within the range of from 250° to 350° C. and then thermally dehydrogenating the product so produced by maintaining said product at a temperature within the range of from 450° to 550° C.

7. A process for the production of methyl esters of terephthalic acid which comprises simultaneously dehydrating and dehydrogenating in the absence of a dehydrogenation catalyst dimethyl cyclohexane-2,5 diol-1,4 dicarboxylate by maintaining said cyclohexane derivative at a temperature within the range of from 350° to 450° C.

8. A process for the production of dimethyl terephthalate which comprises dehydrogenating in the absence of a dehydrogenation catalyst cyclohexa-1,4 diene-1,4 dicarboxylate by maintaining said cyclohexadiene at a temperature within the range of from 450° to 550° C.

References Cited in the file of this patent

UNITED STATES PATENTS

| | | |
|---|---|---|
| 2,121,472 | Niederl et al. | June 21, 1938 |
| 2,316,962 | Lynn et al. | Apr. 20, 1943 |
| 2,371,088 | Webb et al. | Mar. 6, 1945 |
| 2,406,630 | Pines et al. | Aug. 27, 1946 |

FOREIGN PATENTS

| | | |
|---|---|---|
| 738,922 | Germany | Sept. 21, 1943 |

OTHER REFERENCES

Plattner: Newer Methods of Preparative Organic Chemistry, 1948, pp. 31–32.

Hickinbottom: "Reactions of Organic Compounds," pp. 3, 6 to 9 and 109, Longmans, 1948.

Smith et al.: J. A. C. S., vol. 71 (1949), page 413.

Richter: "Textbook of Organic Chemistry," pp. 75, 326; J. Wiley 1952.